(12) United States Patent
Shepherd (10) Patent No.: US 6,540,518 B1
(45) Date of Patent: Apr. 1, 2003

(54) EDUCATIONAL SYSTEM, METHOD AND DOLL FOR TEACHING INDIVIDUALS THEIR EMOTIONS EMPLOYING SETS OF FACES EXPRESSING DIFFERENT EMOTIONS WITH PLURAL STATES

(76) Inventor: Kimberly A. Shepherd, 608 Sheridan Ave., Laramie, WY (US) 82070

( * ) Notice: Subject to any disclaimer, the term of this patent is extended or adjusted under 35 U.S.C. 154(b) by 0 days.

(21) Appl. No.: 09/479,741

(22) Filed: Jan. 7, 2000

Related U.S. Application Data (60) Provisional application No. 60/115,359, filed on Jan. 8, 1999.

(51) Int. Cl.[7] .............................................. G09B 19/00
(52) U.S. Cl. ....................... 434/236; 446/321; 446/337
(58) Field of Search ............................... 434/236, 237, 434/247, 258; 446/321, 337, 338, 339, 340, 391, 392, 393, 394, 395

(56) References Cited

U.S. PATENT DOCUMENTS

| | | | | |
|---|---|---|---|---|
| 3,811,220 A | | 5/1974 | Glass et al. ................ | 46/135 R |
| 4,013,294 A | | 3/1977 | Smeda et al. ............ | 273/134 B |
| 4,122,628 A | | 10/1978 | Cromwell et al. ......... | 46/135 R |
| 4,341,521 A | * | 7/1982 | Solomon ..................... | 434/236 |
| 4,573,927 A | | 3/1986 | Newman ..................... | 434/236 |
| 4,637,798 A | | 1/1987 | Maiden-Nesset ............ | 434/191 |
| 4,710,145 A | | 12/1987 | Hall Vandis ................ | 446/100 |
| 4,762,494 A | | 8/1988 | Woods ........................ | 434/236 |
| 4,798,556 A | | 1/1989 | Vicars et al. ............... | 446/391 |
| 4,917,607 A | | 4/1990 | Van Hoose .................. | 434/236 |
| 5,405,266 A | * | 4/1995 | Frank et al. ................ | 434/237 |
| 5,848,900 A | * | 12/1998 | Pearson ...................... | 434/236 |

\* cited by examiner

*Primary Examiner*—Derris H. Banks
*Assistant Examiner*—Bena B. Miller
(74) *Attorney, Agent, or Firm*—Flanagan & Flanagan; John R. Flanagan (57) ABSTRACT

An educational system for teaching individuals their emotions employs a multiplicity of sets of faces. Each set of faces expresses a different emotion experienced by individuals from time to time. The sets of faces have facial expressions correlated to the different emotions. There are a plurality of states of the particular emotion that are expressed in the facial expressions of each set of faces. The states defined for each of the different emotions are subdued, normal and exaggerated states. The facial expressions on the faces employ certain facial features to express the particular emotions, namely, eyes, eyebrows, a mouth and a nose. These facial features are enclosed in a facial circle. The sizes of these facial features relative to the facial circle change from one state of a particular emotion to another and are smallest in the subdued state, largest in the exaggerated state and inbetween and balanced in the normal state. In an educational method for teaching individuals their emotions, selected ones of the faces of the sets thereof are employed in learning, building and de-building sequences and combinations thereof to assist and guide individuals in understanding, expressing and modifying their emotions. An educational doll provides one substrate to which selected ones of the faces can be applied. The doll has limbs with fan folded sections on which objects, such as faces, can be placed and also has swivels so that the doll can dance or turn allowing a child to have fun while learning his or her emotions.

21 Claims, 10 Drawing Sheets

EDUCATIONAL SYSTEM, METHOD AND DOLL FOR TEACHING INDIVIDUALS THEIR EMOTIONS EMPLOYING SETS OF FACES EXPRESSING DIFFERENT EMOTIONS WITH PLURAL STATES

This patent application claims the benefit of U.S. provisional patent application No. 60/115,359 filed on Jan. 8, 1999.

BACKGROUND OF THE INVENTION

1. Field of the Invention

The present invention generally relates to techniques for helping individuals emotionally so as to improve their learning capability and, more particularly, is concerned with an educational system, method and doll for teaching individuals their emotions employing sets of faces expressing different emotions with plural states.

2. Description of the Prior Art

There are basically four balances or equilibriums to be maintained in every person to enhance his or her learning capability for productive human growth and development. These equilibriums are a person's medical, physical, emotional and intellectual well-being. When only one is unbalanced or in disequilibrium, it can have a disruptive influence on learning capability and potential.

An individual's emotional equilibrium has proven to be one of the most difficult to teach about and restore, especially in the case of children. Children have particular difficulty expressing and dealing with negative thoughts and feelings which they often equate with being "bad" and for which they feel guilt. One approach to helping children express emotions is disclosed in U.S. Pat. No. 4,573,927 to Newman. The Newman patent discloses four facial panels for a doll-like figure which a child can interchange. Three of the four facial panels depict negative emotions of anger, sadness and fear. The fourth panel depicts the positive emotion of happiness. The doll-like figure provides the child with a non-threatening object to either identify with or to use to display observed feelings without feeling guilty of being "bad".

While the approach of the Newman patent appears to be a step in the right direction, its identification of only four emotions and provision of only four facial panels to address these emotions is believed to be an over-simplification of the emotions involved and an inadequate solution for overcoming these kinds of difficulties faced by children. Further, the Newman patent provides substantial uniformity in size of each of the same facial features making up the four facial panels. Whereas the shapes of these same facial features are correlated with the emotions displayed, there appears to be no correlation between the particular emotion displayed and the sizes of the same facial features from one facial panel to the next.

Consequently, a need still remains for an innovation that will provide a more comprehensive in-depth solution to dealing with the above-described difficulties of children without introducing other problems in place thereof.

SUMMARY OF THE INVENTION

The present invention provides an educational system, method and doll for teaching individuals, particularly children, their emotions so as to overcome the potential shortcomings of prior art approaches and to fulfill the aforementioned need. The educational system, method and doll of the present invention employ a multiplicity of sets of faces that have different facial expressions displaying different emotions each with a plurality of states. Underlying the educational system, method and doll of the present invention is a recognition by the inventor herein that there are a multiplicity of emotions and for each emotion there is a plurality of states each having a different facial expression, namely, subdued, normal and exaggerated states.

Accordingly, the present invention is directed to an educational system for teaching individuals their emotions which comprises: (a) at least one and preferably a multiplicity of sets of faces; (b) each of the sets of faces being correlated with a respective one of a multiplicity of different emotions experienced by individuals from time to time; and (c) for each of the different emotions correlated with a respective set of faces, a plurality of states of the emotion are defined in the form of a different facial expression on each of the faces of the respective set thereof.

More particularly, each set of faces contains three faces. The facial expression on each face includes a plurality of facial features thereon. The facial features may include eyes, eyebrows, a mouth and a nose. The facial features of the facial expression on each of the faces of a respective set thereof differ in their relative sizes from one state to another for each emotion expressed. The facial expression on each face of the respective set thereof also includes a circle surrounding the facial features. The facial features of the facial expression on each of the faces of the respective set thereof differ in their sizes relative to the circle from one face to another of the respective set and thus from one state to another for each emotion expressed.

The present invention is also directed to an educational method for teaching individuals their emotions which comprises the steps of: (a) providing a multiplicity of different sets of faces with each set being correlated with one of a multiplicity of different emotions experienced by individuals from time to time; (b) selecting at least a pair of faces from different ones of the sets; (c) displaying the faces of the pair thereof on each of a succession of substrates; and (d) changing the faces of the pair thereof so as to switch emphasis between the faces on the succession of substrates.

More particularly, the faces are displayed on upper left and lower right diagonal portions of the substrate or one of the faces is displayed on a central portion of the substrate. The faces also are alternately displayed on successive ones of the substrates. The faces differ in size and progressively change in size from substrate to substrate.

The present invention is also directed to an educational doll providing a substrate to which selected ones of the faces can be applied. The doll comprises: (a) a body having upper and lower portions; (b) a head attached on the upper portion of the body; (c) a plurality of limbs; (d) means for attaching the limbs respectively to the upper and lower portions of the body; and (e) at least one of the limbs having a stretchable connector assembly and a limb portion attached thereto such that the connector assembly and limb portion allows the limb to be gripped and pulled away from the body and released and return back toward the body. The connector assembly includes a fan folded section connected to the limb portion and a connector strip of elastic stretchable material extending from the body through the fan folded section to the limb portion.

More particularly, the limbs include a pair of arms, one of the arms having a fan folded section therein and a pair of legs, one of the legs having a fan folded section therein. The means for attaching the limbs to the body includes complementary sets of fastening elements which are connectible to and disconnectible from one another for detachably attaching at least some of the limbs to the body.

Furthermore, at least one of the limbs and the head has a swivel element connected thereto permitting grasping of the swivel element and rotating of the doll relative to the swivel element. Also, at least one of the legs has a foot and an elastic band with a ring element attached thereto and the band secured over the foot to permit grasping of the foot via the ring element.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Referring to the drawings and particularly to FIGS. 1 to 14, there is illustrated an educational system of the present invention, generally designated 10, for teaching individuals their emotions. The educational system 10 basically includes a multiplicity of sets of faces having facial expressions which correlate with a multiplicity of different emotions experienced by individuals from time to time. The term "caricatured" can be used to characterize each of the faces in the sense that each face only imitates certain features of a human face and depicts those features in a deliberately exaggerated or distorted manner in order to accurately and effectively emphasis the respective emotion expressed on the particular face.

The sets of caricatured faces depicted respectively in FIGS. 1 to 14 that are identified by the following reference numerals are correlated with the different emotions listed in Table I as follows:

TABLE I

| Reference Numeral | Emotion |
|---|---|
| 12 | tired |
| 14 | afraid |
| 16 | disgusted |
| 18 | sad |
| 20 | revengeful |
| 22 | happy |
| 24 | hurt |
| 26 | frozen |
| 28 | why me |
| 30 | mad |
| 32 | crying |
| 34 | pouting |
| 36 | asleep |
| 38 | surprised |

Figure 1:
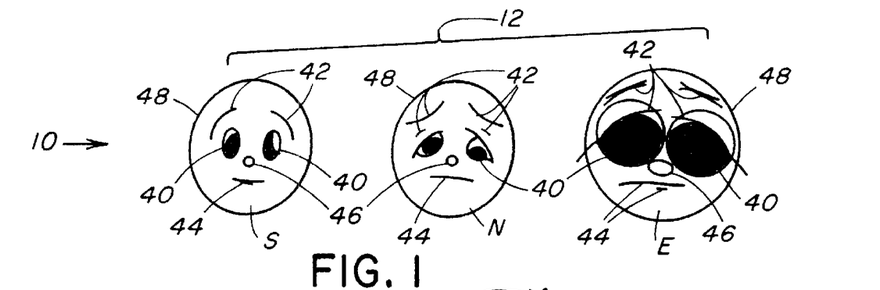
FIGS. 1 to 14 are plan views of a plurality of sets of faces having different facial expressions comprising an educational system of the present invention for teaching individuals their emotions.
Figure 2:
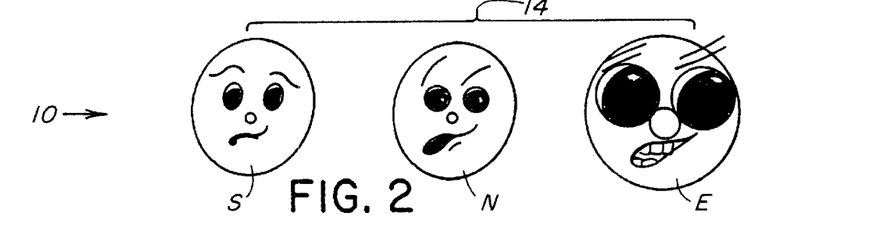
Figure 3:
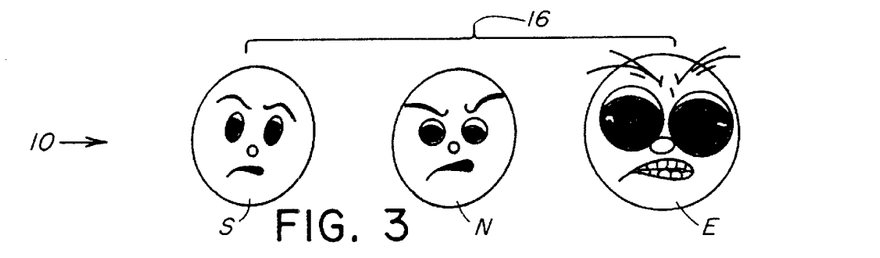
Figure 4:
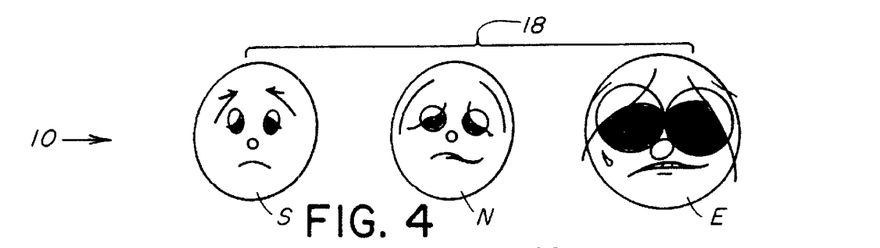
Figure 5:
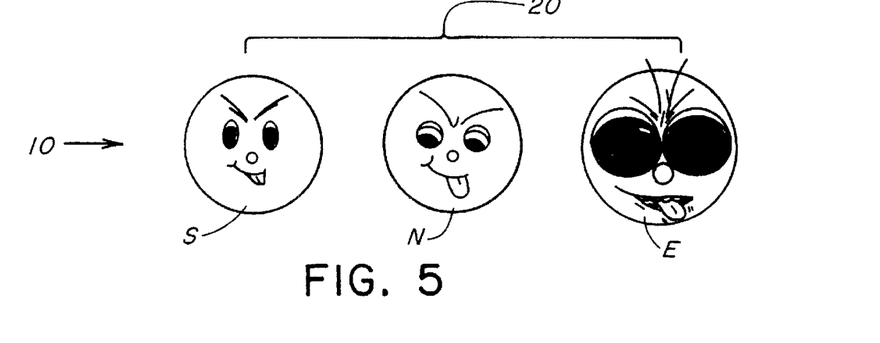
Figure 6:
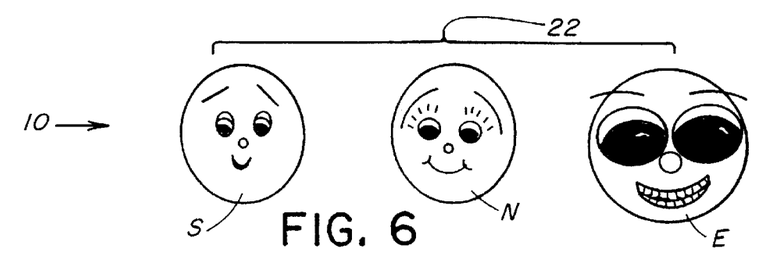
Figure 7:
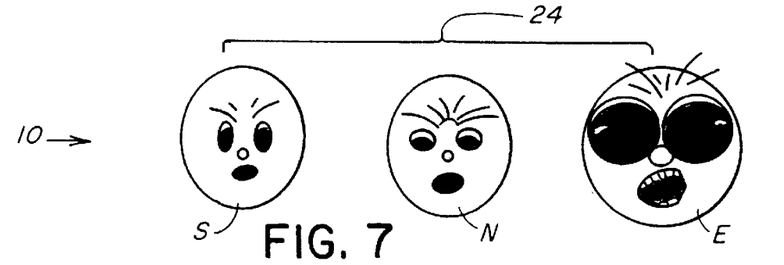
Figure 8:
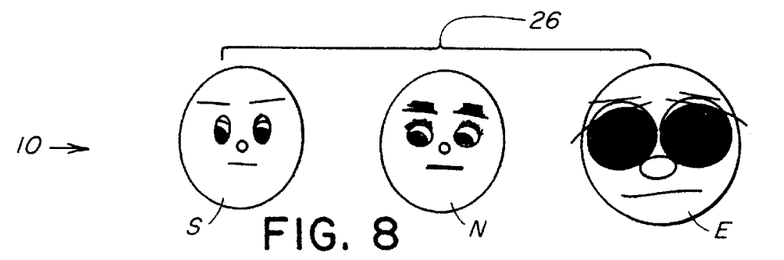
Figure 9:
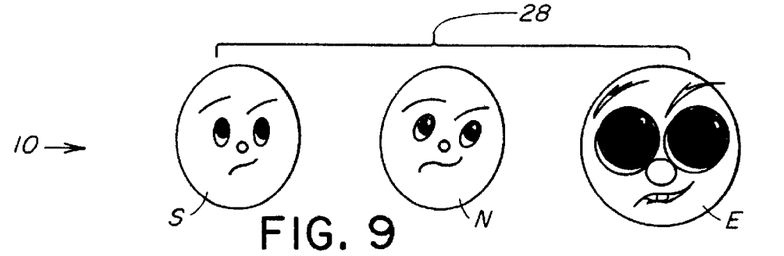
Figure 10:
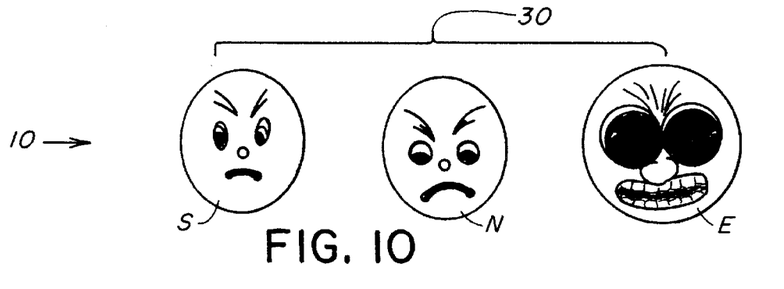
Figure 11:
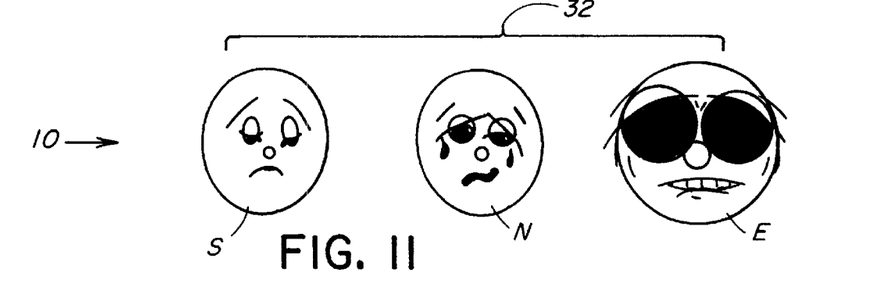
Figure 12:
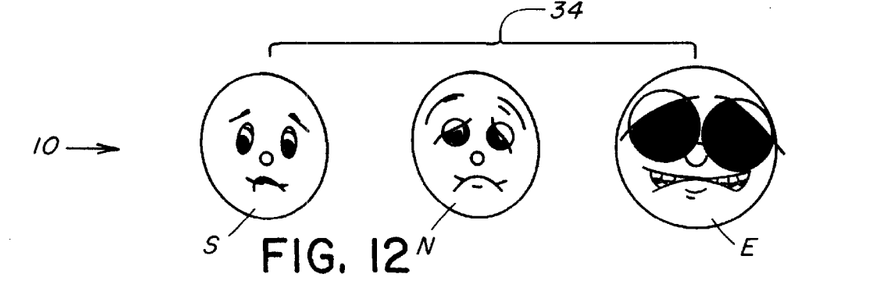
Figure 13:
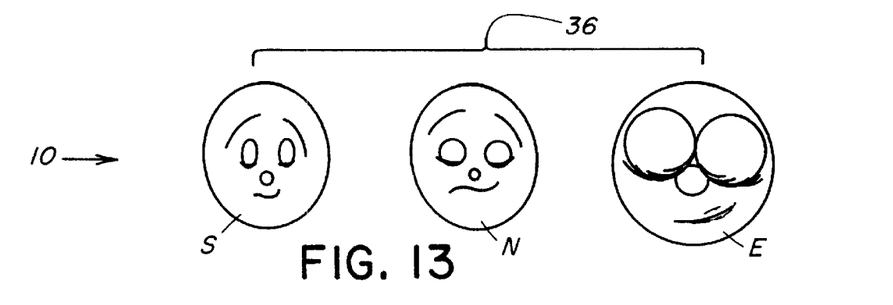
Figure 14:
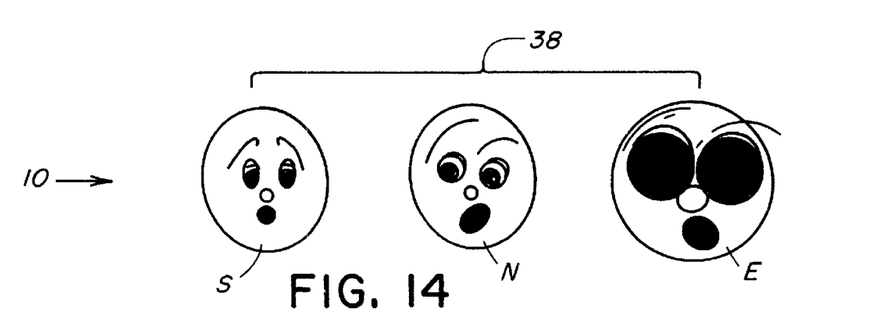

For example, the set of faces 30 in FIG. 10 contains three faces having facial expressions expressing a "mad" emotion. The above listed emotions of Table I are examples only. The present invention is not limited to just these emotions.

Also, for each emotion listed in Table I that is correlated with a respective one of the sets of faces, 12 to 38, a plurality of different states of the emotion are defined by the facial expressions on the faces of the respective set. Preferably, there are three such states for each emotion and thus three facial expressions correlated with such states for each of the above-listed emotions. The reference letters S, N, E are used in FIGS. 1 to 14 to identify the faces of each set 12 to 38 that has facial features expressing the three states of each emotion as follows: S for "subdued"; N for "normal"; and E for "exaggerated". The reference letters S, N, E herein are combined as suffixes to the above-listed reference numerals to identify facial expressions on the faces S, N, E for the three states of each emotion. For example, the facial expression 30S refers to the face S of the set 30 which has facial features expressing a "subdued mad" emotion; the facial expression 12N refers to the face N of the set 12 which has facial features expressing a "normal tired" emotion; and the facial expression 20E refers to the face E of the set 20 which has facial features expressing an "exaggerated revengeful" emotion. The subdued, normal and exaggerated states of emotion expression can also be characterized as decreased, average and increased expressions of the particular emotion.

The facial features that are caricatured in the faces S, N, E of sets 12 to 38 to express the particular emotions are eyes 40, eyebrows 42, a mouth 44 and a nose 46. These facial features are enclosed in a circle 48 which is the boundary of the face S, N, E. For the sake of clarity in the depiction of the faces S, N, E of the different sets 12 to 38 thereof in FIGS. 1 to 14, the identifying reference numerals 40 to 48 of the facial features and the facial circle are only shown in FIG. 1. Also, as can be understood in FIGS. 1 to 14, the relative sizes of these facial features to the facial circles change from one state to another in order to distinguish the different levels of intensity (subdued, normal and exaggerated) of the respective states from one another for each emotion expressed. In particular, for each emotion expressed, the sizes of these facial features in relation or proportion to the size of the facial circle are smallest in the subdued state, largest in the exaggerated state, and inbetween, and in proportion or balance with the size of the facial circle, in the normal state. Also, in the subdued state facial expressions, the eyes 40 are more oval shaped. In the normal state facial expressions, the eyes 40 are more round shaped. In the exaggerated state facial expressions, the eyes 40 are large, round, darkened and take up most of the space of the facial circle 48.

The use of the faces S, N, E of the sets 12 to 38 thereof as depicted in FIGS. 1 to 14 in teaching individuals their emotions is most effective when the faces are applied on a substrate. Examples of various different suitable substrates are dolls, masks, sheets of paper, and any other flat media.

Referring now to FIGS. 15A–15B, 16A–16B and 17A–17B, there are illustrated learning, building and de-building sequences used to assist and guide individuals in learning about, expressing and modifying their emotions. These sequences have various stages that carry out various steps of an educational method of the present invention wherein selected faces having different facial expressions correlated with the different states of emotions are employed. In all of the illustrated sequences, a pair of faces selected from different sets thereof are displayed on a succession of substrates 50, for example sheets of letter size paper.

Figure 15A:
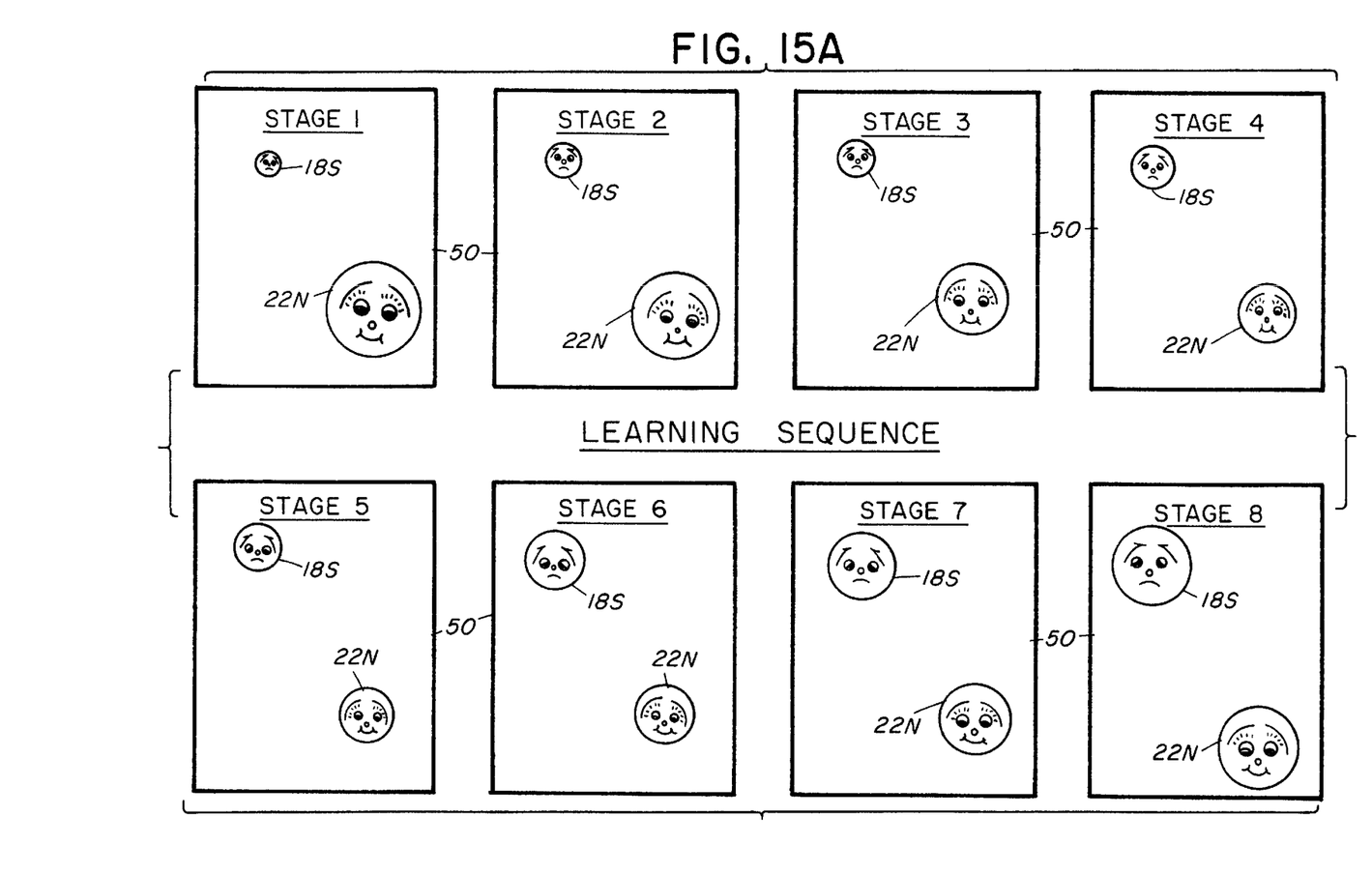
FIGS. 15A and 15B together depict a plurality of successive stages in an emotion learning sequence employing selected ones of the faces in accordance with an educational method of the present invention for teaching individuals their emotions.
Figure 15B:
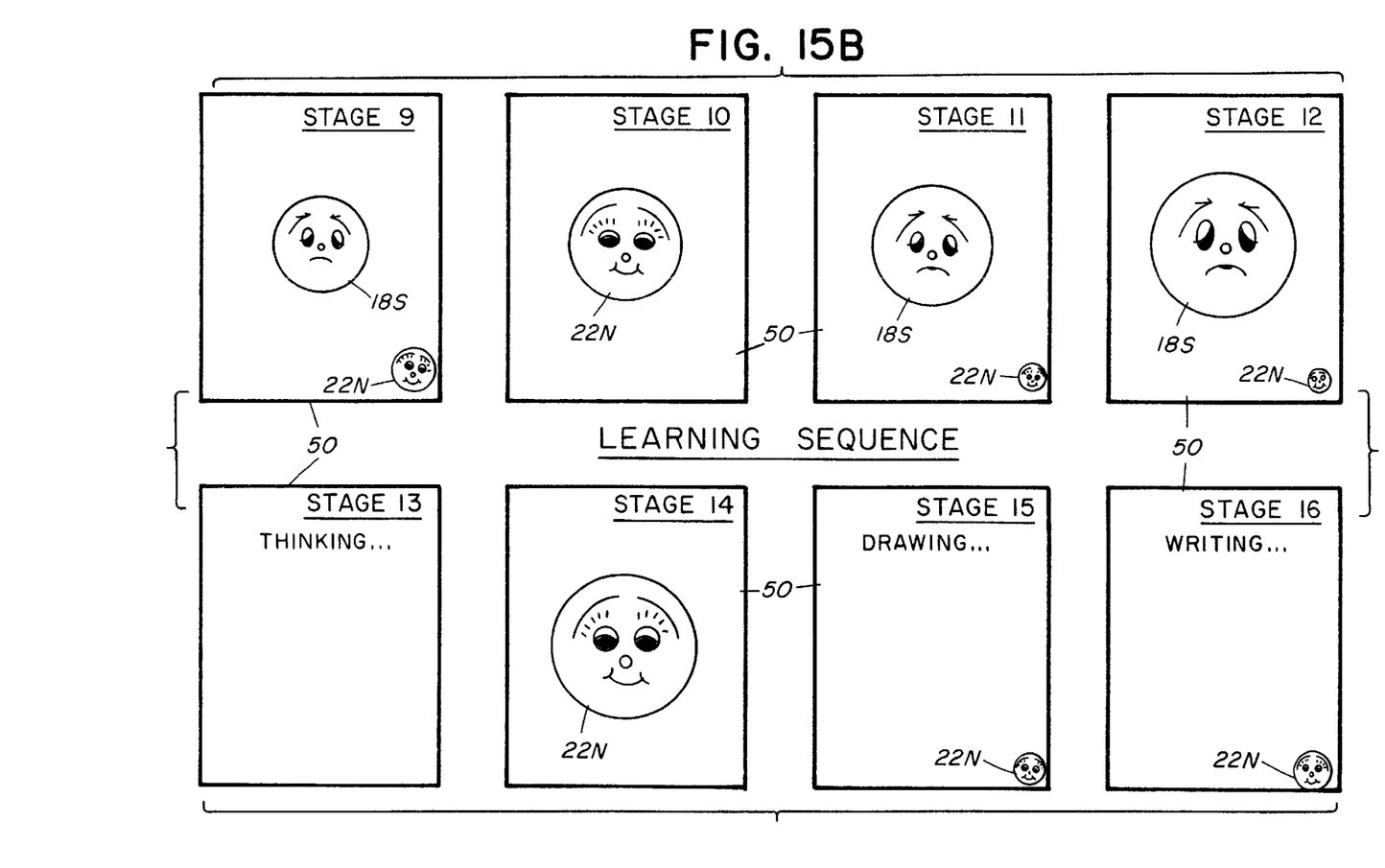
Figure 16A:
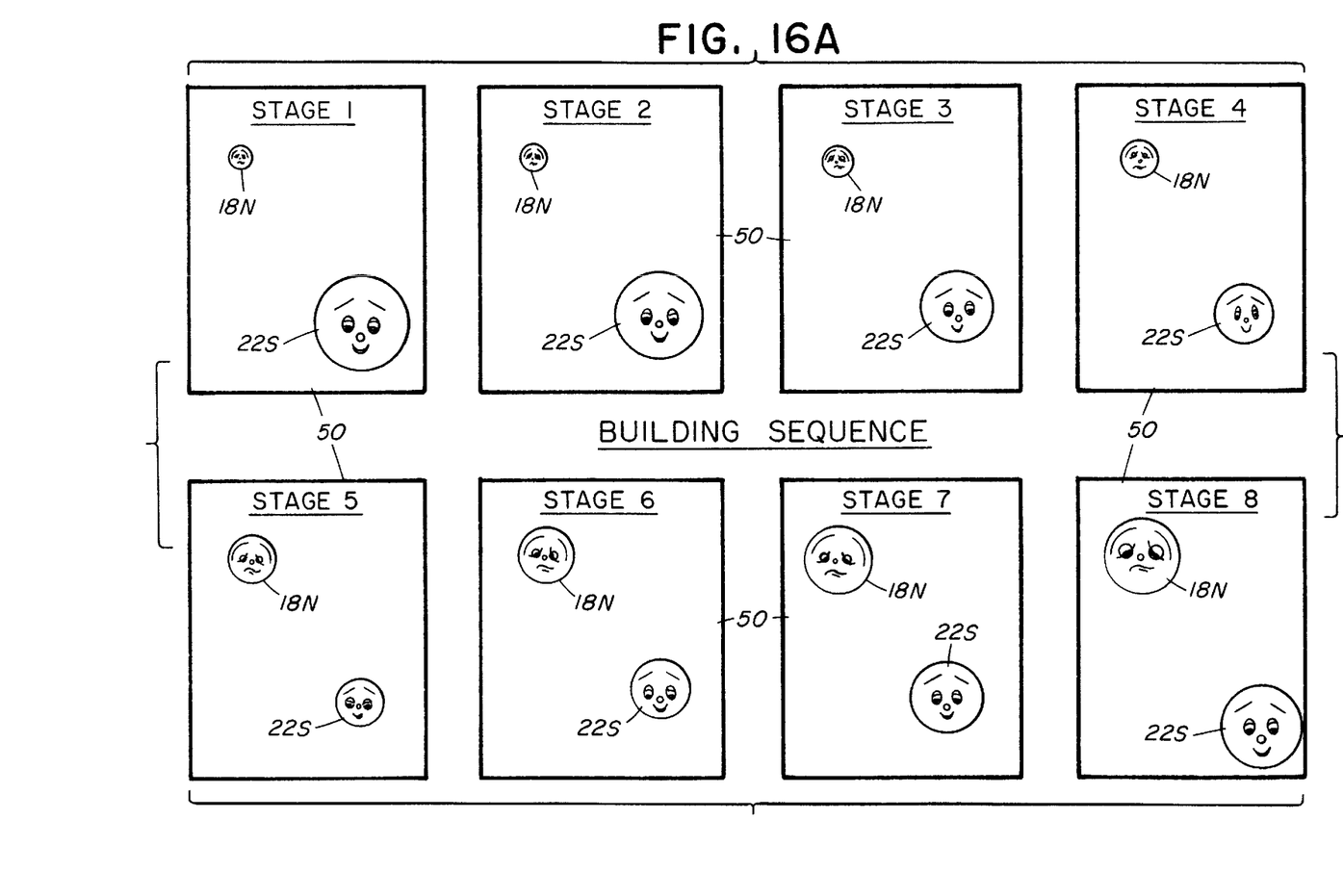
FIGS. 16A and 16B together depict a plurality of successive stages in an emotion building sequence employing selected ones of the faces in accordance with the educational method of the present invention.
Figure 16B:
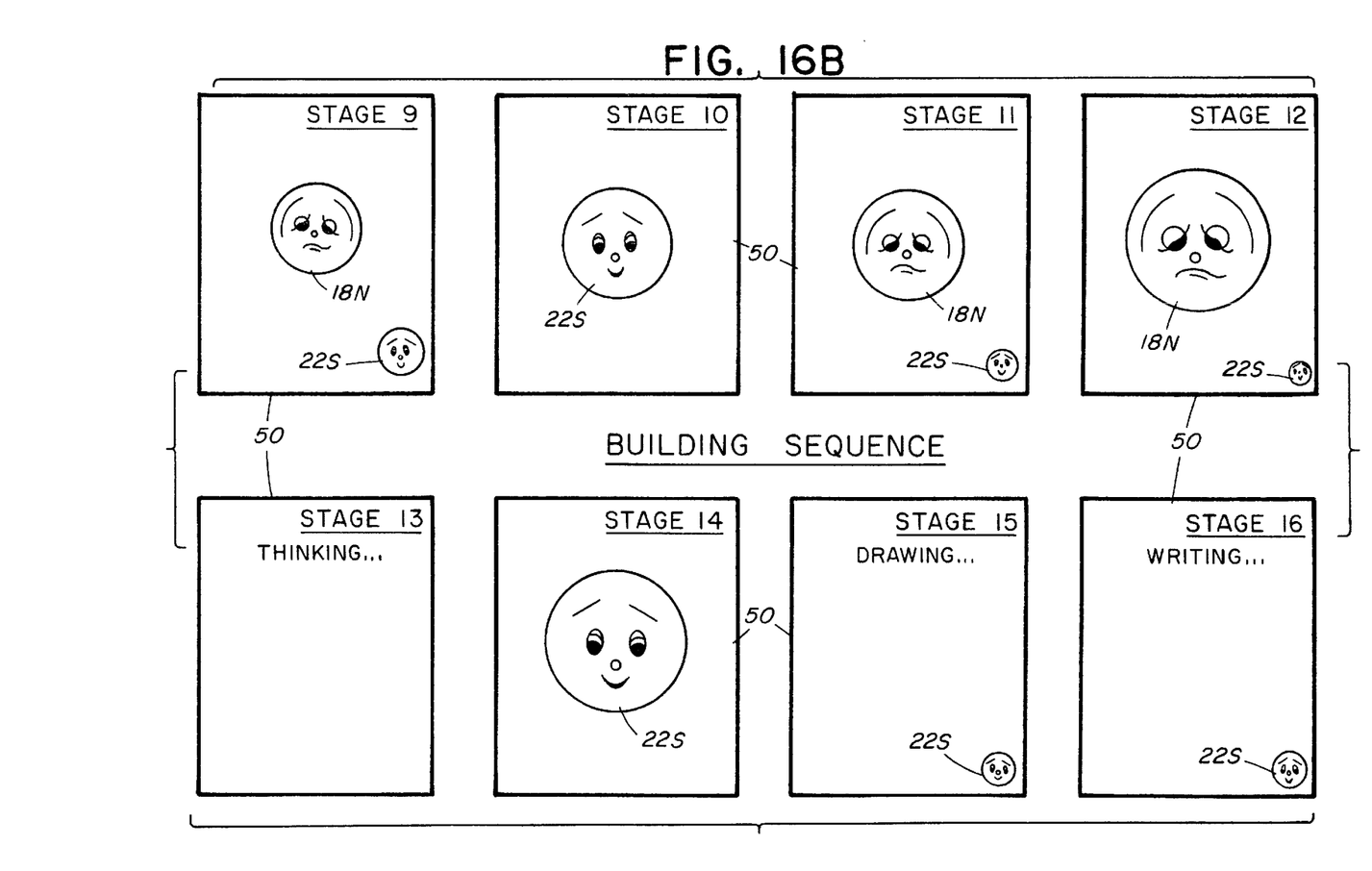
Figure 17A:
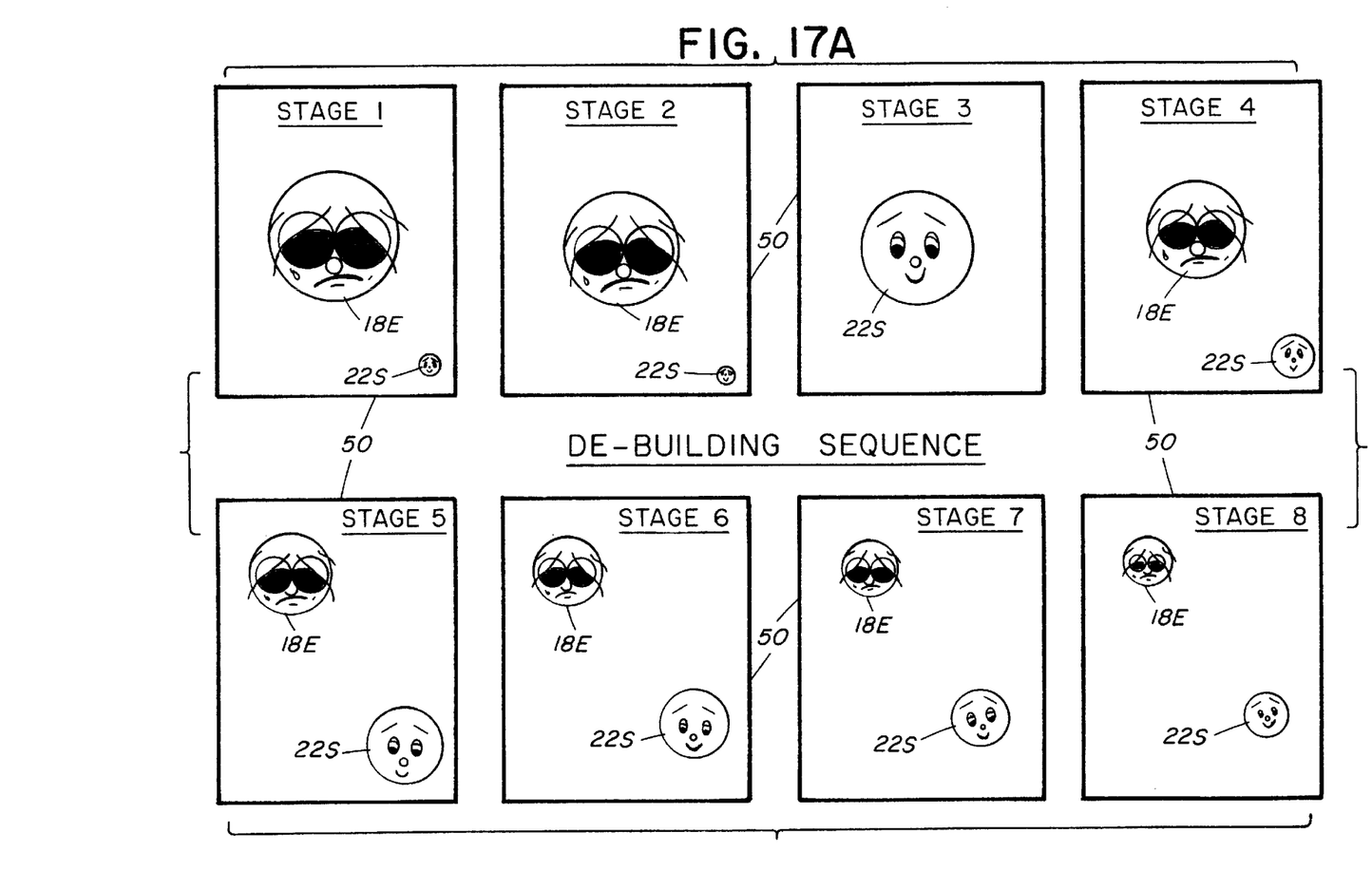
FIGS. 17A and 17B together depict a plurality of successive stages in an emotion de-building sequence employing selected ones of the faces in accordance with the educational method of the present invention.
Figure 17B:
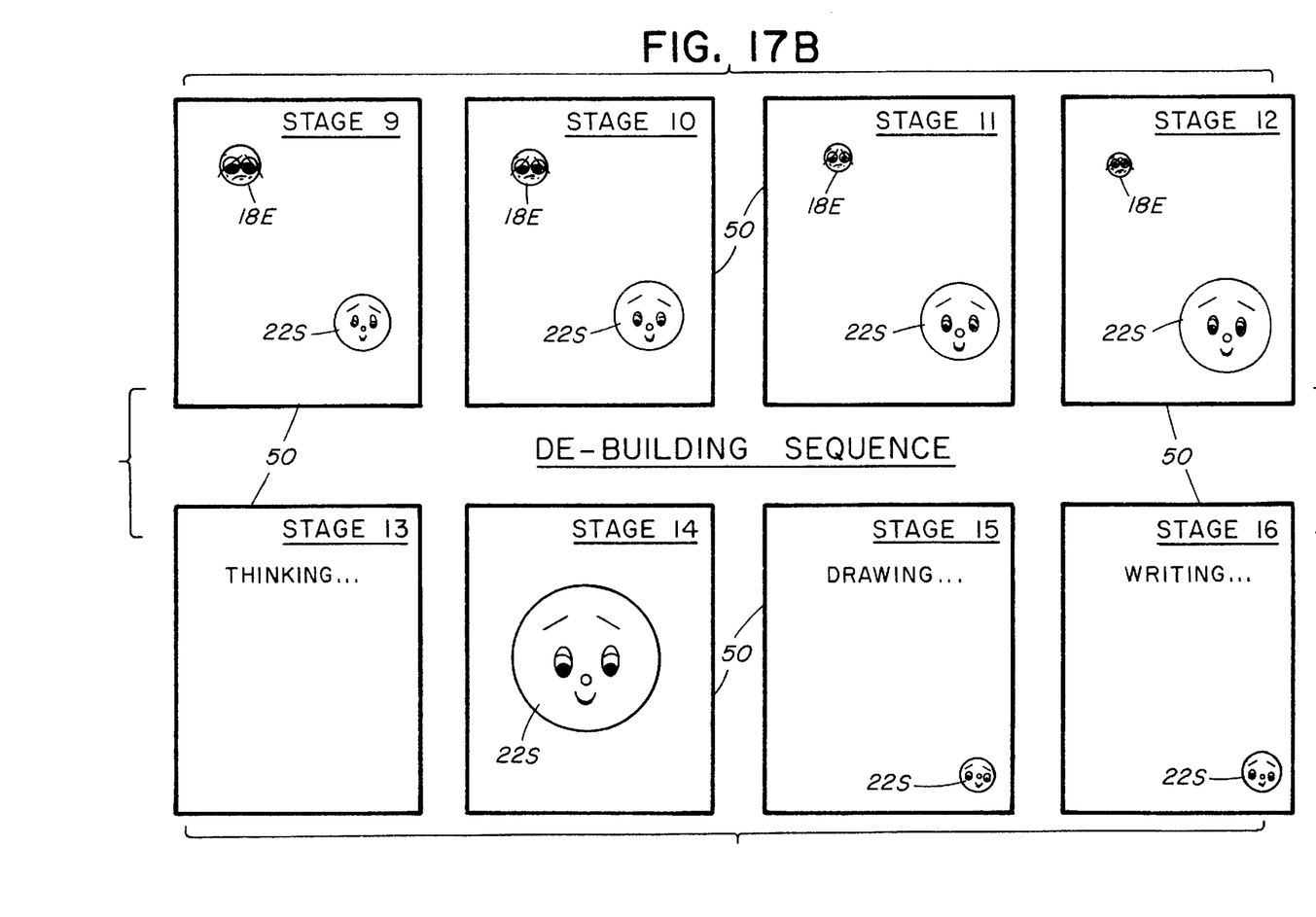

In the learning sequence of FIGS. 15A–15B, faces having facial expressions 18S and 22N are displayed. The face 18S expresses a "subdued sad" emotion whereas the face 22N expresses a "normal happy" emotion. In the building sequence of FIGS. 16A–16B, faces having facial expressions 18N and 22S are displayed. The face 18N expresses a "normal sad" emotion whereas the face 22S expresses a "subdued happy" emotion. In the de-building sequence of FIGS. 17A–17B, faces having facial expressions 18E and 22S are displayed. The face 18E expresses an "exaggerated sad" emotion whereas the face 22S expresses a "subdued happy" emotion.

In all of the sequences there are stages included where the faces are changed so as to switch emphasis between the faces on the succession of substrates 50. In the learning and building sequences of FIGS. 15A–15B and 16A–16B, the faces are displayed on diagonal portions of the substrates 50 and, particularly, in opposing upper left and lower right portions of the substrates 50. Because individuals are taught to read from left to right, the upper left face will ordinarily be the first one encountered by the individual. The face in the upper left portion of a first substrate 50 is substantially smaller in size than the other face displayed in the lower right portion of the first substrate. The smaller size of the upper left face makes it much less fearful to the individual being taught than the larger lower right face. In the stages of the learning sequence of FIGS. 15A–15B, the upper left face 18S progressively increases in size, for example 20% on some of the successive substrates 50, in going from the first to last substrate 50 whereas the lower right face 22N progressively decreases in size, for example 20% on some of the successive substrates 50, in going from the first to last substrate 50. In the stages of the building sequence of FIGS. 16A–16B, the upper left face 18D and lower right face 22S progressively increase in size, for example 20% on some of the successive substrates 50, in going from the first to eighth substrates 50. In the de-building sequence of FIGS. 17A–17B, the one face 18S is displayed on a central portion of the substrate 50.

The learning, building and de-building sequences of FIGS. 15A–15B, 16A–16B and 17A–17B are just a few of the many sequences in which faces from the sets thereof of FIGS. 1 to 14 can be employed in accordance with the teaching method of the present invention to teach individuals their emotions.

Figure 18:
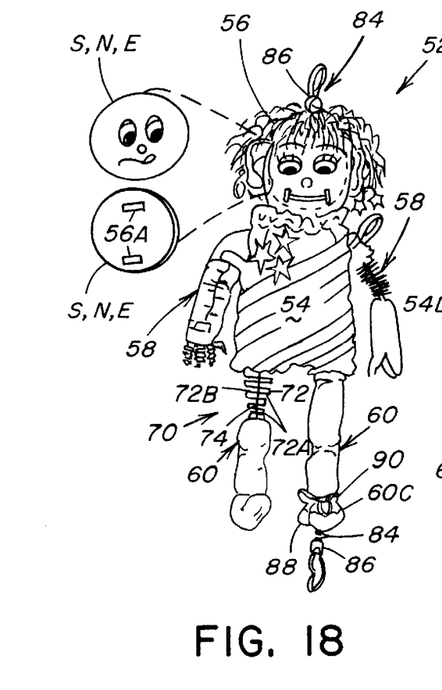
FIG. 18 is a front elevational view of an educational doll providing one form of a substrate to which selected ones of the faces can be applied.
Figure 19:
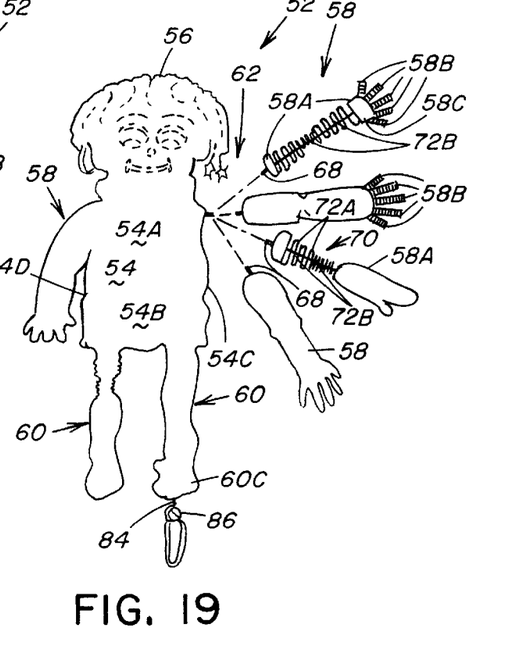
FIG. 19 is another front elevational view of the doll showing different forms of the arms which can be detachably attached to the body of the doll.
Figure 20:
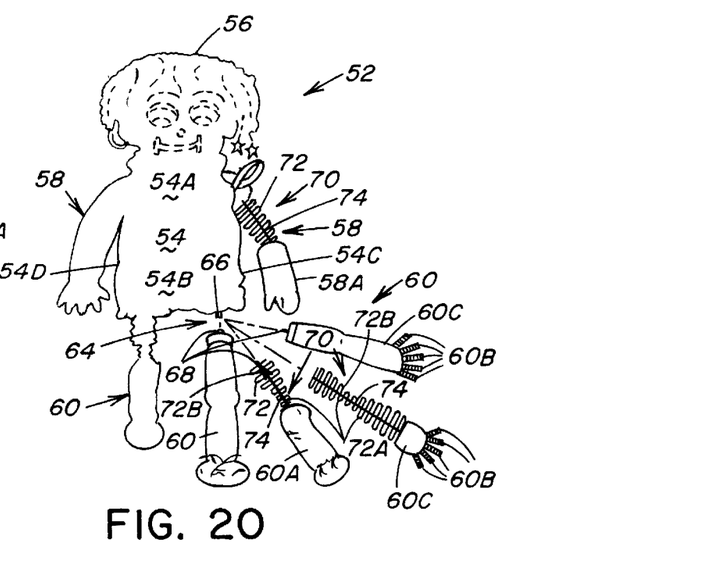
FIG. 20 is another front elevational view of the doll showing different forms of the legs which can be detachably attached to the body of the doll.

Referring now to FIGS. 18 to 20, there is illustrated an educational doll, generally designated 52, providing one form of the substrate 50 to which selected ones of the faces S, N, E of the sets 18 to 38 thereof can be applied. The doll 52 includes a plurality of body parts, preferably, a trunk or body 54, a head 56, and a plurality of limbs preferably in the form of a pair of arms 58 and a pair of legs 60. The body 54 has upper and lower portions 54A, 54B and opposite lateral sides 54C, 54D. The head 56 is attached on the upper portion 54A of the body 54. The head 56 is adapted to have a selected one of the faces S, N, E of the different sets 12 to 38 thereof, being in a pancake-like flat form, detachably and interchangeably applied to a front surface of the head 56 in any suitable manner, such as by use of complementary hook and loop fastening material 56A. Also, the doll 52 can be provided with patches of loop fastening material thereon so that the faces S, N, E can be placed at various locations on the doll. The doll 52 also includes means 62 for detachably attaching the arms 58 to the opposite sides 54C, 54D of the body 54 at the upper portion 54A thereof and adjacent to opposite lateral sides of the head 56. The doll 52 further includes means 64 for attaching the legs 60 to the lower portion 54B of the body 54 at locations adjacent to the opposite sides 54C, 54D of the body 54 such that each of the legs 60 adjacent to one of the opposite sides 54C, 54D of the body 54 is disposed diagonally across the body from one of the arms 58 at the other of the opposite sides 54C, 54D of the body 54. The means 62, 64 for respectively attaching each of the arms 58 and legs 60 to the body 54 includes complementary sets of fastening elements 66, 68 which are connectible to and disconnectible from one another for detachably attaching the respective arms 58 and legs 60 to the body 54. The fastening elements 66, 68 can take any suitable form such as conventional snaps, patches of hook and loop fasteners and the like. Alternatively, some or all of the arms 58 and legs 60 can be permanently attached to the body 54, such as by being sewn thereto.

FIGS. 19 and 20 respective show different forms of the arms 58 and legs 60 which can be detachably attached to the body 54 of the doll 52. Some of the forms of the arms and legs 58, 60 respectively include arm and leg portions 58A, 60A and stretchable connector assemblies 70 attached thereto to allow the arm and leg portions 58A, 60A to be gripped by a child and pulled away from the body 54 and then released so that the arm and leg portions 58A, 60A return back toward the body 54. The stretchable connector assemblies 70 include fan folded sections 72 connected between the body 54 and respective arm and leg portions 58A, 60A. By the use of patches of hook and loop material applied thereon, the fan folded sections 72 are adapted to hold various objects, such as the faces, on top of or between the folds. Optionally, connector strips 74 of stretchable material can be provided attached to and extending from the body 54 through the fan folded sections 72 to the arm and leg portions 58A, 60A. Fingers 58B of hands 58C on the arms 58 and toes 60B of feet 60C on the legs 60 can also be in the form of fan folded sections.

Figure 21:
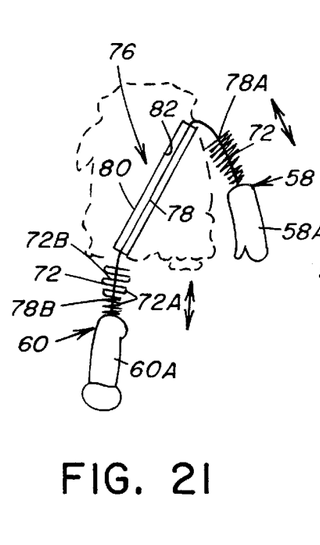
FIG. 21 is a fragmentary view of the doll showing an elastic connection between an arm and a leg of the doll which are disposed diagonally across the body from one another.

FIG. 21 shows a modified embodiment of the stretchible connector assembly, generally designated 76 extending between an arm 58 and a leg 60 of the doll 52 which are disposed diagonally across the body 54 from one another. Preferably, the modified connector assembly 76 includes a pair of the fan folded sections 72 with one being disposed in the one arm 58 and the other being disposed in the one leg 60 disposed diagonally across the body 54 from the one arm 58. The modified connector assembly 76 also includes an elongated connector strip 78 of material at least portions of which are stretchable, the connector strip 78 extending diagonally across the body 54, such as exteriorly along a back thereof, and having opposite end portions 78A, 78B which can be the stretchible portions extending through the fan folded sections 72 and attached to respective arm and leg portions 58A, 60A of the arm and leg 58, 60 so as to allow the diagonally disposed arm and leg portions 58A, 60A to be gripped and pulled away from the body 54 and released and then returned back toward the body 54. The modified connector assembly 76 also includes a cover strip 80 of material attached to the body, such as the exterior back portion of the body 54 so as to define a passageway 82 along the body 54 with the connector strip slidably extending therethrough.

Further, at least one of the legs 60 and the head 56 has a swivel element 84 connected thereto with a ring element 86 to permit grasping of the swivel element 84 by a child and rotating of the doll 52 relative to the swivel element 84 by the child. Also, the swivel elements 84 can be provided on clothing worn by the doll 52 and adapted to have objects, such as the faces S, N, E mounted to the swivel elements 84.

Still further, at least one of the feet 60C of the legs 60 has an elastic band 88 with a ring element 90 attached thereto. The elastic band 88 is secured over the one foot 60C so as to permit grasping of the foot 60C via the ring element 90 on the elastic band 88. The elastic band 88 could also be secured over the hand 58C of an arm 58.

The fan folded sections 72, ring element 90 and swivel elements 84 on the doll 52 variously permit a child to decorate the doll 52 with objects and to make the doll 52 dance, turn or spin as the child holds the doll 52, thereby allowing a child to have fun with the doll 52 while learning his or her emotions.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. An educational system for teaching individuals their emotions, comprising:
   (a) at least one set of plural faces;
   (b) said set of said plural faces being correlated with a respective one and only one of a multiplicity of different emotions experienced by individuals from time to time; and
   (c) for said respective one and only one emotion correlated with said one set of said plural faces, a plurality of states of said respective one and only one emotion are defined in the form of different facial expressions on said plural faces of said one set thereof which distinguish different levels of intensities of the respective states from one another.

2. The system of claim 1 wherein said one set of said plural faces contains three faces.

3. An educational system for teaching individuals their emotions, comprising:
   (a) a multiplicity of sets of plural faces;
   (b) each of said sets of said plural faces being correlated with a respective one and only one of a multiplicity of different emotions experienced by individuals from time to time; and
   (c) for each of said different emotions correlated with a respective one of said sets of said plural faces, a plurality of states of said one and only one emotion are defined in the form of a different facial expression on each of said plural faces of said respective one set thereof which distinguish different levels of intensities of the respective states from one another.

4. The system of claim 3 wherein each set of said plural faces contains three faces.

5. The system of claim 3 wherein said facial expression on each of said faces of said respective set thereof includes a plurality of facial features thereon.

6. The system of claim 5 wherein said facial features include eyes, eyebrows, a mouth and a nose.

7. The system of claim 5 wherein at least some of said facial features of said facial expressions on said faces of said respective set thereof change in their relative sizes from one state to another in order to distinguish the different levels of intensity of the respective states from one another for each emotion expressed.

8. The system of claim 7 wherein said facial expression on each of said faces of said respective set thereof also includes a facial circle surrounding said facial features.

9. The system of claim 8 wherein said facial features of said facial expression on each of said faces of said respective set thereof differ in their sizes relative to said facial circle from one face to the another of said respective set and thus from one state to another for each emotion expressed.

10. The system of claim 9 wherein said sizes of said facial features are smallest relative to said facial circle surrounding said facial features on a face of said respective set representing a subdued state for the emotion expressed by said respective set of faces.

11. The system of claim 9 wherein said sizes of said facial features are largest relative to said facial circle surrounding said facial features on a face of said respective set representing an exaggerated state for the emotion expressed by said respective set of faces.

12. The system of claim 9 wherein said sizes of said facial features are balanced relative to said facial circle surrounding said facial features on a face of said respective set representing a normal state for the emotion expressed by said respective set of faces.

13. An educational method for teaching individuals their emotions, comprising the steps of:
   (a) providing a multiplicity of different sets of plural faces with each set being correlated with one and only one of a multiplicity of different emotions experienced by individuals from time to time and wherein for each of the different emotions correlated with a respective one of said sets of plural faces, a plurality of states of said one and only one emotion are defined in the form of a different facial expression on each of said plural faces of said respective one set thereof which distinguish different levels of intensities of the respective states from one another;
   (b) selecting at least a pair of faces from different ones of said sets;
   (c) displaying said faces of said pair thereof on each of a succession of substrates; and
   (d) changing said faces of said pair thereof so as to switch emphasis between said faces on said succession of substrates.

14. The method of claim 13 wherein said faces are displayed on diagonal portions of some of said substrates in said succession thereof.

15. The method of claim 13 wherein at least one of said faces is displayed on a central portion of some of said substrates in said succession thereof.

16. The method of claim 13 wherein said faces are alternately displayed on successive ones of said substrates.

17. The method of claim 13 wherein said faces are respectively displayed in opposing upper left and lower right portions of some of said substrates in said succession thereof.

18. The method of claim 17 wherein the one of said faces displayed in the upper left portion of a first substrate in said succession thereof is substantially smaller in size than the other face displayed in the lower right portion of said first substrate.

19. The method of claim 18 wherein the one of said faces progressively increases in size in going from said first of said substrates to a last of said substrates in said succession thereof.

20. The method of claim 18 wherein the other of said faces progressively decreases in size in going from said first of said substrates to said last of said substrates in said succession thereof.

21. The method of claim 13 wherein said facial expression on each of said plural faces of said respective one of said sets thereof includes a plurality of facial features thereon, said facial features of said facial expression on one of said plural faces of said respective one set differ in their relative sizes from one state to another in order to distinguish the different levels of intensity of the respective states from one another for each emotion expressed.

\* \* \* \* \*